April 22, 1952     W. J. DORSAM     2,593,421
CHART WINDING MECHANISM
Filed Oct. 11, 1945     2 SHEETS—SHEET 1
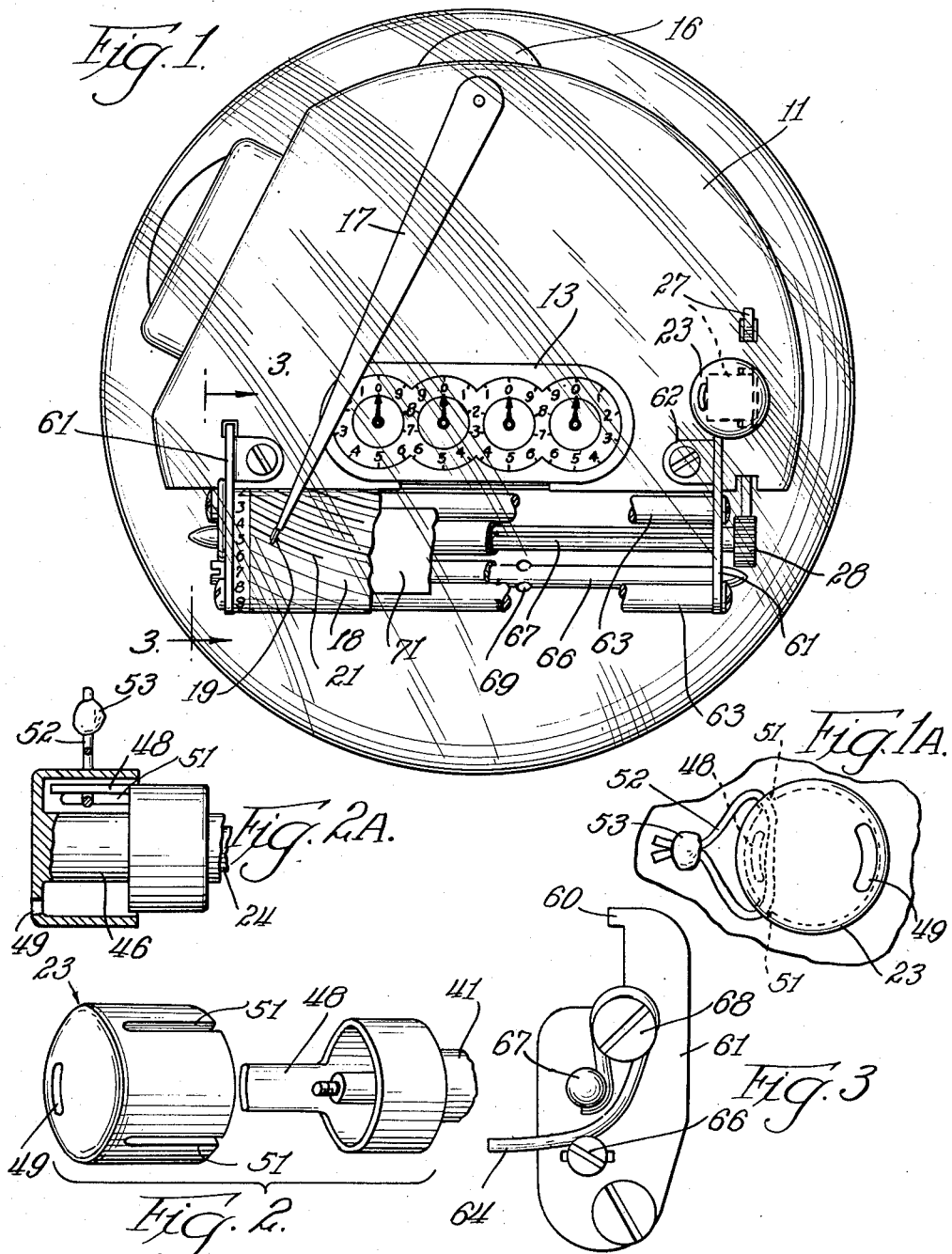
INVENTOR.
William J. Dorsam
BY
Banning & Banning & Robertson
Attys

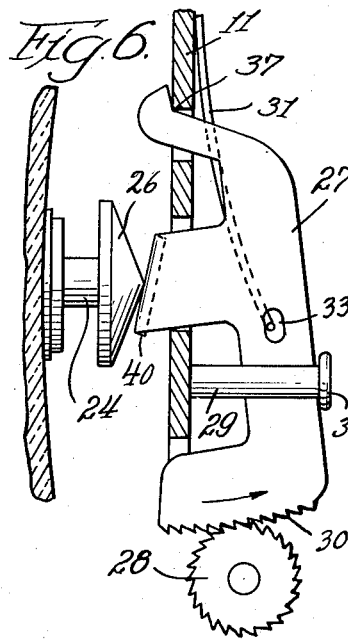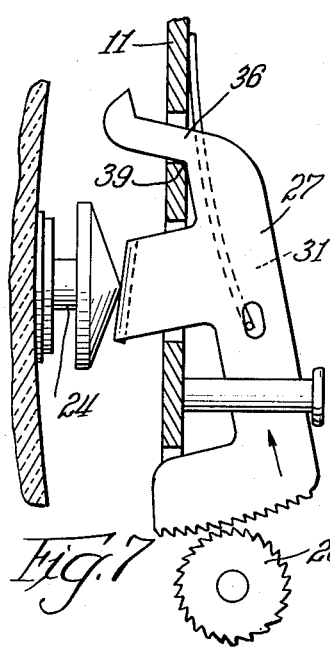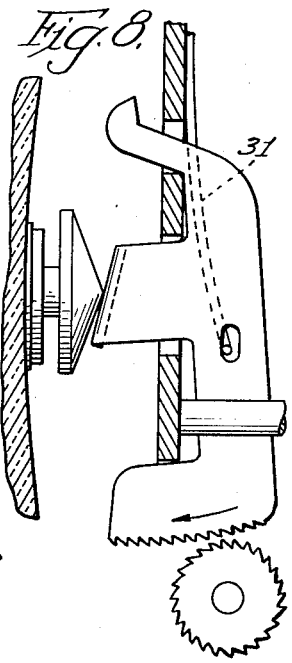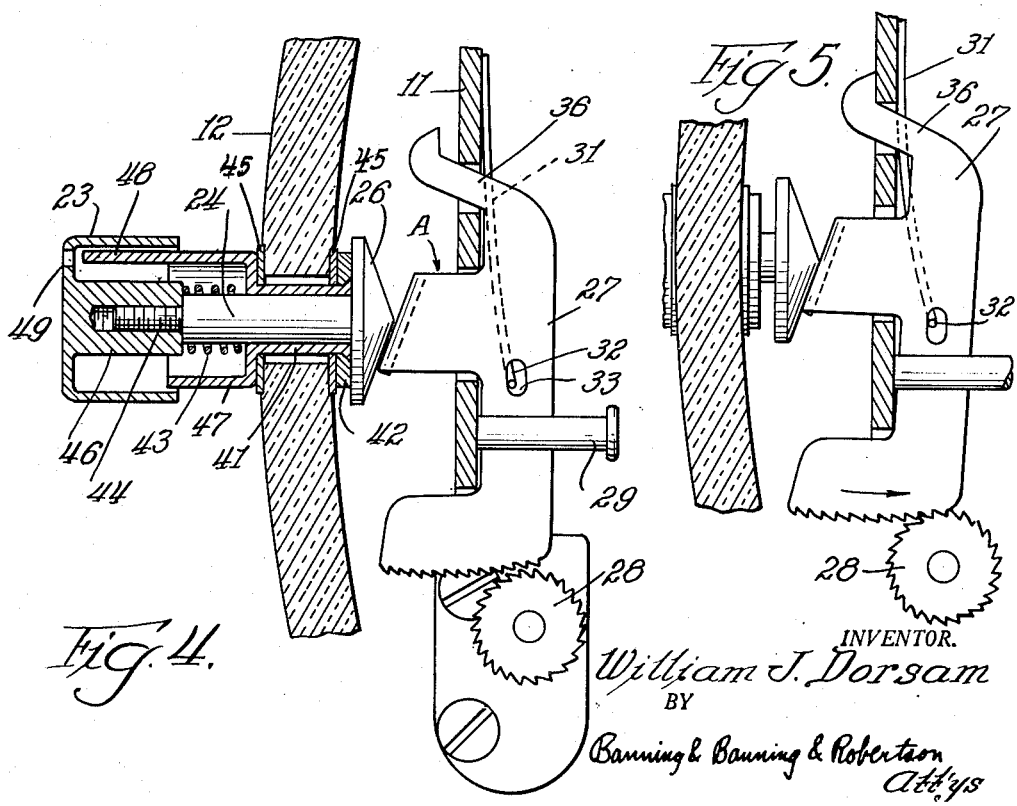

Patented Apr. 22, 1952

2,593,421

UNITED STATES PATENT OFFICE 2,593,421

CHART WINDING MECHANISM

William J. Dorsam, La Fayette, Ind., assignor to Duncan Electric Manufacturing Company, La Fayette, Ind., a corporation of Illinois Application October 11, 1945, Serial No. 621,726

5 Claims. (Cl. 242—55)

In connection with electric meters, such as those used in ordinary homes or in factories for measuring the electrical energy used, it is often desirable to know the "maximum demand" during the billing period. A consumer may be charged not only for the amount of energy which he uses but also for the amount of plant and distribution equipment which is required to supply his maximum demand. The provision of an entirely satisfactory, inexpensive, combined meter for registering both energy consumption and maximum demand has been a long-standing problem. The simpler types were not quite as dependable as desired because it was possible to jar the meter so that a false demand indication would be given.

It has been proposed before this invention to provide a chart which would be advanced slightly at the end of each billing period, the demand indicator moving back and forth along a single path all during the billing period and indicating the maximum demand by the furthest point to which it had traced its line during the billing period. This has an important advantage over a constantly moving chart in that a short length of chart paper will suffice for years. The present invention is particularly concerned with the problem of mounting and moving the chart, although in some of its aspects, it is capable of a wide variety of uses.

According to one feature of the invention, a reciprocating actuator of a toothed wheel is provided which is not only extremely simple but which minimizes wear on the driving teeth by separating these teeth on the return stroke.

Another feature of the invention is in the provision of a simple actuating button mounted on the cover of the meter and provided with a rod passing through the cover for actuating the chart-moving mechanism. In spite of its simplicity, the button is provided with means for the application of a sealing wire to prevent tampering and means for substantially eliminating the likelihood of accidental actuation if the seal is omitted.

According to another feature of the invention, a very simple chart-mounting device is provided which not only holds the chart flat but also supplies the necessary frictional braking so that proper operation of the ratchet mechanism is ensured.

Additional objects and advantages of the invention will become apparent from the following description and from the drawings; in which, Figure 1 is a face view of a meter embodying the present invention with some parts broken away for the purposes of illustration;

Fig. 1A shows the face of the sealed operating button on the meter cover;

Fig. 2 is an exploded view of the button carried by the cover;

Fig. 2A is an axial sectional view through the button assembly;

Fig. 3 is an end view of the chart unit as viewed from the line 3—3 of Fig. 1;

Figs. 4 to 8 are fragmentary views illustrating successive steps in the operation of the chart advancing mechanism, Fig. 4 showing the starting position and also showing a sectional view through the button of Fig. 2 carried by the cover.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

In the form of the invention chosen for illustration, the recording mechanism is used in conjunction with a combined watt-hour integrating and demand meter, the front view of which is shown in Fig. 1. The meter mechanism is mainly hidden by a front plate 11 which serves as a base or mounting plate for the recording mechanism of this invention. However, the meter mechanism together with the front plate 11 is carried by a base which also carries a glass cover 12. A register 13 is driven by the rotating disk of the meter element, the register being mounted on the front plate 11.

In addition to the meter mechanism which drives the register 13, a demand meter mechanism 16 is provided. This drives an indicator or sweep hand 17 which moves along a chart 18. The chart 18 is preferably formed of a heat-sensitive paper, a paper treated or coated with a heat-sensitive substance. In that event, the indicator 17 is provided with a hot wire stylus 19 which heats the paper in contact therewith or adjacent thereto so as to make visible on the chart paper the path which the stylus follows.

According to a previous proposal, the chart paper 18 will ordinarily be stationary. Accordingly, the stylus 19 will move back and forth along the same path or zone of the paper. The mechanism 16 is preferably a thermal type of demand meter mechanism so that the indicator 17 constantly seeks a position proportional to the instantaneous demand, the heat transfer and generating characteristics providing a very desirable time lag. The time lag prevents the complete response of a mere momentary surge of current.

The indicator 17 could be driven by a demand mechanism of the interval type by which it would be reset to the zero position at the end of intervals of say fifteen minutes, being driven forward during the interval by the main meter disk.

With either type of demand meter it is apparent that the most advanced position of the indicator 17 during a billing period will correspond to the maximum demand during that period. This maximum demand will be indicated by the position of the end of the line 21 produced by the stylus 19. At the end of the billing period, the chart 18 should be advanced just far enough to provide comfortable separation between successive lines 21. This advancing could be performed automatically but at present it is contemplated that it will be accomplished by the meter reader. It is desirable, however, that the meter reader be able to advance the chart with the least possible difficulty and without removing the cover 12. According to the present invention, a button 23 is provided which is carried by the cover 12. Seen best in Fig. 2A or Fig. 4, the button 23 is carried by a plunger 24 which is provided with a head 26 on the inside of the cover 12. The head 26 engages the actuator 27 and moves the actuator to drive a toothed wheel 28 which advances the chart 18.

*Actuator ratchet*

An important feature of the present invention is the simplified form of the actuating plate 27 and its mounting. It will be observed that it has a ratchet type of action in that its forward stroke, but not its return stroke, drives the pinion or toothed wheel 28. At present, the teeth of the wheel 28 and the teeth 30 of the actuator 27 have been made as ratchet-shaped teeth. In view of the action of the actuator, however, it is quite possible that this shaping is not necessary. Accordingly, in referring to these parts as ratchet parts, it is intended to indicate that they function to drive in one direction and not the other, regardless of the shape of the teeth.

It will be observed that the ratchet action is obtained without any pawl except in so far as the actuator 27 might be considered a pawl. But the actuator 27 is constructed of only a single part and can be stamped from sheet metal. It is carried by the front or mounting plate 11 and guided by a pin or guide 29 which in turn is carried by mounting plate 11. Except for the plate 27, the only moving part is spring 31 which urges the actuator 27 to the starting position seen in Fig. 4.

Upon pressing the button 23, the first movement of the actuator 27 is to the position shown in Fig. 5. This movement results from the fact that the actuating force is applied by plunger head 26 on a line positioned beyond inturned end 32 of spring 31 from the active or lower end of actuator 27. The inturned end 32 of spring 31 extends into a slot 33 permitting the actuator to move longitudinally without restraint by the spring.

The upper or remote end of actuator 27 is provided with a hook or cam arm 36. As the actuator 27 is shifted from the Fig. 4 position to the Fig. 5 position, the cam arm 36 reacts on the mounting plate 11 to cam the actuator 27 toward the pinion 28 bringing the teeth 30 of the actuator 27 into mesh with the teeth of the actuator 28. It may be mentioned that the use of ratchet-shaped teeth which present no wide surface at the tooth tips facilitates the meshing of these teeth.

Upon further movement of the plunger 24, the actuator 27 is tilted about the point 37 of the mounting plate 11 which serves as a fulcrum. In this motion, the actuator 27 drives the pinion 28 as indicated by the arrow in Fig. 6. The movement is limited by the head or stop 38 on guide pin 29.

As described below, rotation of the pinion 28 is resisted by frictional braking by spring 64. Accordingly, the first movement of the actuator 27 when the plunger 24 is released is that indicated in Fig. 7. Here the resistance to movement of the pinion 28 has prevented the spring 31 from returning the active end of actuator 27 toward the mounting plate 11. Accordingly, the cam arm 36 has shifted toward the position shown in Fig. 7, the lower surface of this cam arm engaging point 39 of mounting plate 11 to shift the actuator 27 in the direction indicated by the arrow in Fig. 7.

As soon as the teeth of actuator 27 have been drawn clear from the teeth of pinion 28, the spring 31 will press the actuator in the return direction as indicated by the arrow in Fig. 8, the parts coming to rest at the starting position shown in Fig. 4.

It will be observed that the return movement of the actuator 27 produces virtually no wear on the teeth. In the ordinary ratchet and pawl mechanism, the pawl rubs along the ratchet for the entire return movement. The cam action of cam arm 36 on the return stroke draws the teeth clear before the return of the teeth toward the mounting plate begins. The pressure of spring 31 is too weak to cause any appreciable deformation of the tips of the teeth as they wipe clear from one another.

The actuator 27 may be slipped into place from below the mounting plate 11 by merely slipping the arm 36 through the plate end first and then swinging the rest of the actuator into proper position. In spite of this ease of assembly, there is no danger of the parts slipping out of position during operation because the pressure of the plunger head 26 on the inturned lug 40 of the actuator tends to press it against the guide pin 29 so that this pin prevents tilting of the actuator. As seen in Fig. 1, the center of button 23 is well to the left of the main plane of actuator 27.

The inturned lug or actuating arm 40 has been shown as inclined to match the inclination of plunger head 26 which is of conical shape. If preferred, however, both the plunger head and the inturned lug could be flat and vertically disposed. This would be especially desirable if the angular position of the cover is likely to vary from time to time enough to cause improper operation with the shape shown.

*Actuating button*

The plunger 24 which connects the button 23 with the head 26 slides in a bushing or collar 41. The bushing 41 extends through the glass cover 12 and may be secured therein in any manner as by being peaned over either directly against the glass or against a washer 42. The washer 42 may be countersunk for receiving the peaning so as to leave a smooth surface to bear against the head 26 for the purpose of forming a seal to prevent the entry of dust or water into the meter casing. A gasket of felt or other suitable material may be provided. The washer 42 and the enlarged portion of bushing 41 may be separated from the glass by gaskets 45 bearing on seats cut down to be perpendicular to the axis of the bushing, the contour of the glass not being as perpendicular as shown, at this point.

A spring 43 is compressed between button 23 and bushing 41 so as to urge the plunger outwardly. The plunger 24 is provided with a threaded reduced extension 44 onto which the hub 46 of the button is screwed.

The bushing 41 may be provided with an enlarged cup 47 which serves both to shield the spring and to aid the plunger in guiding the button.

To facilitate application of a seal and to minimize the likelihood of accidental operation of the button 23, a finger 48 is preferably provided. This may take the form of a projection from the cup 47 which approximately engages the far wall of the button 23 when the parts are in the position shown in Fig. 2A. This will prevent the button 23 from being pressed except when an aperture 49 is aligned with the finger 48 as seen in Fig. 4.

Unauthorized actuation of the button 23 with consequent advancing of the chart will not serve to cheat the seller of electric energy because the record will not disappear and the paths along which the stylus operates will be numbered or dated so that the meter reader can detect any unauthorized movement. Nevertheless, there will be some objection to unauthorized operation if only because it uses up paper and may necessitate the cost of opening the meter to replace the paper. Accordingly, it is desirable to make provision for sealing the button 23 against operation if the seller of the electricity should so desire. To this end, the button is provided with slots 51 through which the conventional sealing wire 52 may be passed, the two ends of the sealing wire being thereafter sealed in a conventional lead seal 53. Of course, the meter reader will remove this seal, turn the button to align aperture 49 with finger 48, press the button 23, release it, turn the button half way around, and replace the seal. The sealing wire passes between finger 48 and aperture 49 preventing the button from being turned to secure their alignment.

Instead of operating as shown, the button and actuator could be constructed so that the button operates a cam to cam the actuator, either by turning the cam or by a simple thrust.

*Chart unit*

The chart unit may include a frame including two end plates 61 provided with slotted attachment ears 62 for securing the frame to the mounting plate 11. Accurate positioning may be ensured by providing lugs 60 to slip into apertures in the mounting plate 11.

The end plates 61 are rigidly spaced apart by rods 63 which complete the frame and which also serve as guides along which the paper is drawn.

To apply the chart paper, the spring 64 shown in Fig. 3 is sprung upwardly to release a spindle 66 which is then drawn axially out from the frame. A roll of paper including a cardboard tubular core or spool to which the inner end of the paper is cemented is then slipped between the end plates 61, and the spindle 66 is pressed through the spool until its reduced end slips into a bearing hole in the further end plate 61. The chart paper is then drawn around the lower rod 63 up in front of the unit and back over the upper rod 63. The leading end of the paper is tapered at the end and is fitted through a slot in a winding spindle 67 to which the pinion 28 is keyed.

So that the paper will always be drawn taut and will lie flat between the rods 63, it is desirable to apply frictional braking to the spindles 66 and 67. This is accomplished by the spring 64. From Fig. 3 it is seen that the spring 64 passes around a screw 68, the head of which preferably has an annular groove to receive it. The shorter end of the spring extends into and bears against an annular groove in spindle 67. It also hooks around the spindle to hold the spring properly positioned. When the spring has been removed, this spindle may be withdrawn from the frame at the far end. The longer end of the spring 64 extends into and bears against an annular groove in spindle 66.

From the foregoing, it is seen that the spring 64 not only applies frictional tension to the spindles so as to keep the paper stretched taut but also holds the spindles in the proper axial position. Furthermore, they apply more frictional braking to the spindle 67 than to the spindle 66. This is desirable so that there will be enough resistance to the turning of spindle 67 so that it will not turn backwards under the combined influence of the tension on the paper and the pressure exerted on it by actuator 27 under the influence of spring 31 before the actuator has been drawn clear of the pinion 28.

The spindle 66 requires only enough braking to hold the paper taut. Except for a safe margin beyond this, further braking would be undesired since it would merely increase the force required to advance the chart. Hence, the spring 64 need not bear against spindle 66 with much force. The braking resistance is applied from the spindle 66 to the chart by means of small ears 69 pinched up on the spindle 66 and biting slightly into the tubular core of the chart roll. Although these ears have been shown about the center of the rod for convenience of illustration, they would be, in fact, near the left-hand end of the rod so as to come into engagement with the tube only when the spindle has been inserted nearly to its final position. The end plate through which the spindle is inserted, shown in Fig. 3, is notched to permit the passage of these ears.

A platen 71 has been shown in Fig. 1 bridging between the rods 63. This platen preferably forms a smooth continuation of the surface of the rods 63. It withstands the slight pressure which the indicator 17 may exert against the paper so that paper will not be pressed out of its proper plane. It also serves to ensure uniformity of flow of heat from the hot stylus 19 so that the action of the stylus will be uniform at the different parts of its path. In addition, it preferably is rigidly secured to both rods to increase rigidity. If desired, an arcuate scale may be provided just below the sweep of indicator 17. This may be carried by lugs formed on the end plates 61.

To facilitate rewinding of the paper on the spindle 66 to a proper starting point after it has been secured to and started on spindle 67, a screw-driver slot is provided in the end of spindle 66 as seen in Fig. 3.

One of the problems solved by this mechanism is the provision of the chart unit within the available space in a conventional meter casing. It will be observed, for example, that the spindles 66 and 67 are quite close together. As the paper is wound onto one of these spindles, however, it is removed from the other so that the decreasing roll automatically makes room for the increasing size of the other roll.

From the foregoing, it is seen that a very simple chart mechanism has been provided which includes several features of simplification. A very simple actuator is provided with functions with a ratchet type of operation although having no separate moving parts corresponding to a pawl. A simple actuating button for manual actuation from the outside of the cover, in spite of its simplicity, minimizes the likelihood of accidental actuation and provides facilities for sealing against any unauthorized actuation. Proper movement of the actuator on its return stroke is ensured by a brake-applying spring which applies more tension to the windup spindle cooperating with the actuator than to the supply spindle, and which serves to hold both spindles in place, and to hold the chart stretched taut

I claim:

1. Chart-mounting and advancing apparatus for demand meters and the like, including a case having a cover, a chart-carrying frame within the case including a pair of rotatable spindles from one to the other of which a chart is wound, a ratchet wheel for driving the spindle on which the chart is wound, actuating means for actuating the ratchet wheel including a base member having a pair of slots therethrough and a pin projecting perpendicularly from the base member, and a ratchet plate having an elongated hook extending through one of the slots and an actuating arm extending through the other, resilient means urging the ratchet plate against the base member with the hook spaced therefrom, the resilient member engaging the plate at such a position that pressure applied to the operating arm will bias the ratchet plate toward the pin to slide thereon and will first tilt the ratchet plate to bring its hook into engagement with the base, the shank of the hook being so shaped that this initial movement will cam the ratchet plate toward the ratchet wheel and the ratchet plate having teeth which are brought into engagement with the ratchet wheel by this camming movement; the ratchet plate being disposed for further movement upon further actuation of the operating arm in the same direction to actuate the ratchet wheel, means to frictionally oppose the rotation of the spindles and reverse rotation of the ratchet wheel so that upon release of the actuating pressure from the operating arm the first action under influence of the spring will be a tilting of the ratchet plate to move the hook away from the base, the shank of the hook being shaped to draw the teeth of the ratchet plate away from the ratchet wheel by this movement, and a plunger carried by the cover and adapted upon manual thrust to engage the operating arm and operate the ratchet plate as described.

2. Chart-mounting and advancing apparatus for demand meters and the like including a chart-carrying frame including a pair of rotatable spindles from one to the other of which a chart is wound, a ratchet wheel for driving the spindle on which the chart is wound, actuating means for actuating the ratchet wheel including a base member having a pair of slots therethrough and a pin projecting perpendicularly from the base member, and a ratchet plate having an elongated hook extending through one of the slots and an actuating arm extending through the other, resilient means urging the ratchet plate against the base member with the hook spaced therefrom, the resilient member engaging the plate at such a position that pressure applied to the operating arm will bias the ratchet plate toward the pin to slide thereon and will first tilt the ratchet plate to bring its hook into engagement with the base, the shank of the hook being so shaped that this initial movement will cam the ratchet plate toward the ratchet wheel and the ratchet plate having teeth which are brought into engagement with the ratchet wheel by this camming movement; the ratchet plate being disposed for further movement upon further actuation of the operating arm in the same direction to actuate the ratchet wheel, and means to frictionally oppose the rotation of the spindles and reverse rotation of the ratchet wheel so that upon release of the actuating pressure from the operating arm the first action under influence of the spring will be a tilting of the ratchet plate to move the hook away from the base, the shank of the hook being shaped to draw the teeth of the ratchet plate away from the ratchet wheel by this movement.

3. A ratchet device including a toothed wheel and actuating means therefor including a base and a toothed actuator including an operating portion to which force is applied approximately along a given line, a return spring applying force in the opposite direction between this line and the teeth and double-acting cam means beyond this line from the teeth and so disposed and co-acting with the base that the application of force along said line will first tilt the actuator and cam it toward the toothed wheel, and means for limiting the movement of the cam means so that further application of force along said line will tilt the actuator about a part of the base and thereby actuate the toothed wheel, said base having a projecting guide surface and said actuator being loosely mounted adjacent said guide surface in the base and having a portion offset therefrom in a direction away from the guide surface and adapted to receive the actuating force whereby said actuating force wil bias the actuator against the guide surface to slide thereon.

4. A ratchet device including a toothed wheel and actuating means therefor including a base and a toothed actuator including an operating portion to which force is applied approximately along a given line, a return spring applying force in the opposite direction between this line and the wheel and double-acting cam means beyond this line from the wheel and so disposed and co-acting with the base that the application of force along said line will first tilt the actuator and cam it toward the toothed wheel, and means for limiting the movement of the cam means so that further application of force along said line will tilt the actuator about a part of the base and thereby actuate the toothed wheel.

5. A ratchet device including a ratchet wheel, actuating means for actuating the ratchet wheel including a support member having a pair of slots therethrough and a pin projecting perpendicularly from the support member, and an actuating plate having an elongated hook extending through one of the slots and an actuating arm extending through the other, resilient means urging the actuating plate against the support member with the hook spaced therefrom, the resilient member engaging the plate at such a position that pressure applied to the operating arm will bias the actuating plate toward the pin to slide thereon and will first tilt the actuating plate to bring its hook into engagement with the support member, the shank of the hook being so shaped that this initial movement will cam the actuating plate toward the ratchet wheel and the actuating plate having teeth which are brought into engagement with the ratchet wheel by this camming movement; the actuating plate being disposed for further movement upon further actuation of the operating arm in the same direction to actuate the ratchet wheel, and means to frictionally oppose reverse rotation of the ratchet wheel so that upon release of the actuating pressure from the operating arm the first action under influence of the spring will be a tilting of the actuating plate to move the hook away from the support member, the shank of the hook being shaped to draw the teeth of the actuating plate away from the ratchet wheel by this movement.

WILLIAM J. DORSAM.

REFERENCES CITED

The following references are of record in the file of this patent:

UNITED STATES PATENTS

| Number | Name | Date |
| --- | --- | --- |
| 452,930 | Tack | May 26, 1891 |
| 471,066 | Bowen | Mar. 15, 1892 |
| 1,189,309 | Taylor | July 4, 1916 |
| 1,248,678 | Landsiedel | Dec. 4, 1917 |
| 1,347,884 | White et al. | July 27, 1920 |
| 1,563,382 | Legg | Dec. 1, 1927 |
| 1,651,553 | Sheridan | Dec. 6, 1927 |
| 2,109,281 | Bosma | Feb. 22, 1938 |
| 2,246,034 | Elison | June 17, 1941 |
| 2,389,259 | Horlacher | Nov. 20, 1945 |
| 2,471,194 | Capps | May 24, 1949 |

FOREIGN PATENTS

| Number | Country | Date |
| --- | --- | --- |
| 2,182 | Great Britain | May 7, 1892 |